April 15, 1952     H. B. O'BRIEN     2,593,337

VEHICLE SIGNAL

Filed Oct. 24, 1949

Inventor

Hugh B. O'Brien

By *Clarence A. O'Brien and Harvey B. Jacobson*

Attorneys

Patented Apr. 15, 1952

2,593,337

UNITED STATES PATENT OFFICE 2,593,337

VEHICLE SIGNAL

Hugh B. O'Brien, Beckley, W. Va.

Application October 24, 1949, Serial No. 123,181

1 Claim. (Cl. 200—59)

The present invention relates to new and useful improvements in vehicle signalling devices for indicating proposed changes of directions of travel of the vehicle, as well as for use as a warning signal to pedestrians or drivers of other vehicles.

An important object of the invention is to provide novel push-button control switches for selectively energizing a group of signalling lamps together with means for breaking the circuit of all of the lamps when desired.

A further object of the invention is to provide a novel switch panel or housing for the several push-button switches as well as for the switch opening or resetting mechanism.

A still further object is to provide a device of this character of simple and practical construction, which is efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
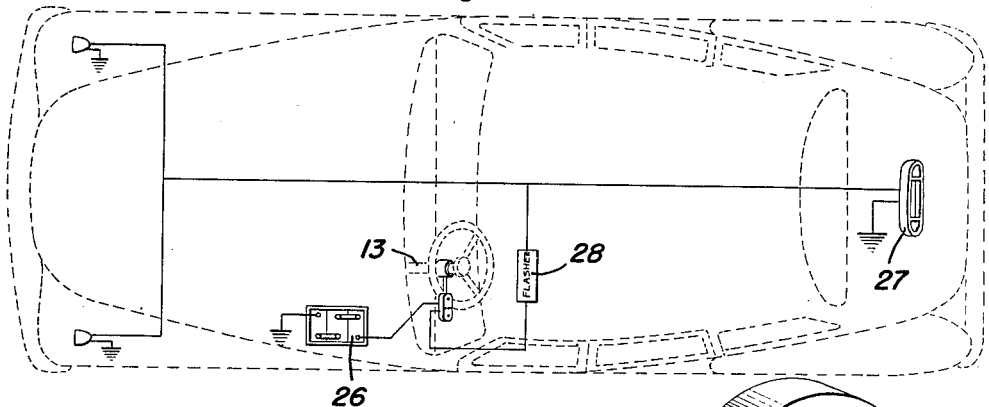
Figure 1 is a top plan view of an automobile showing the diagram of the electric circuit for the signalling device.
Figure 2:
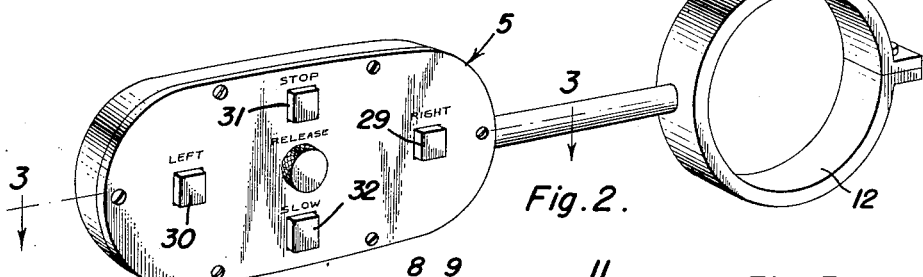
Figure 2 is an enlarged perspective view of the switch housing or panel and attaching arm therefor.
Figure 3:
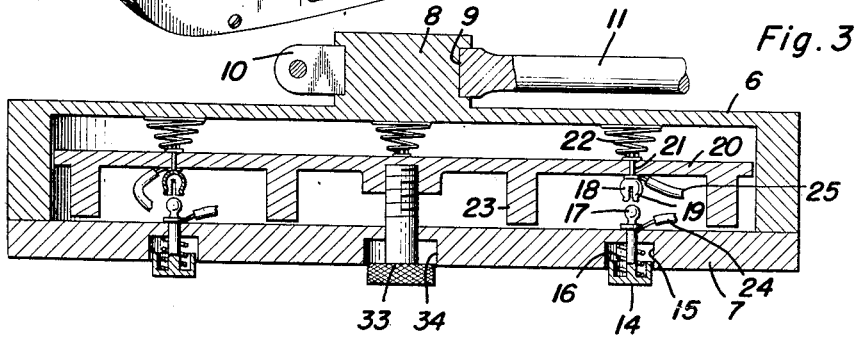
Figure 3 is an enlarged sectional view taken on a line 3—3 of Figure 2.
Figure 4:
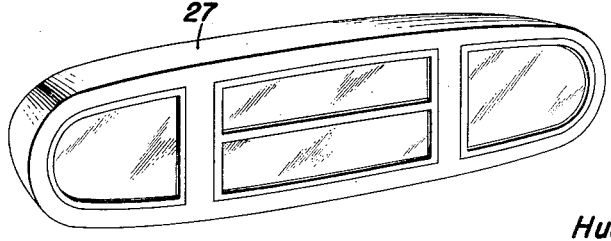
Figure 4 is a perspective view of the lamp housing for the signalling device.

Referring now to the drawing in detail, wherein, for the purpose of illustration, I have disclosed a preferred embodiment of the invention, the numeral 5 designates generally the switch housing or panel and including a back section 6 and cover plate 7 suitably secured thereon.

The back section 6 is formed with a lug 8 having an annular groove 9 therein and in which a split clamp 10 is secured for rotatable adjustment of the switch housing therein. The clamp 10 is formed at one end of a supporting arm 11 having a split clamping collar 12 at its outer end for clamping on the steering post 13 of a motor vehicle to support the switch housing or panel 5 in a convenient position for the driver of the vehicle.

A plurality of push buttons 14 of suitable insulation material are slidably mounted in recesses 15 in cover plate 7, the push buttons being projected outwardly in front of the cover plate by coil springs 16 positioned in the recesses and engaged behind the heads of the push buttons.

A ball-shaped contact 17 is suitably secured to the inner end of each push button 14 for movement into and out of engagement with stationary contacts 18 of substantially cup-shape or socket construction and composed of a plurality of resilient fingers 19 to snap into engagement with contact 17.

The stationary contacts 18 are secured to a movable support 20 in housing 5 by means of a suitable fastener 21 which also secures coil springs 22 to the back of the support 20 and which bear against the rear or back section 6 of the housing 5, the springs 22 normally holding the support 20 in a forward position in the switch housing. Stops 23 project forwardly from the support 20 to engage the cover plate 7 to limit forward movement of the support and with the contacts 17 and 18 separated or spaced from each other.

Circuit wires 24 and 25 connect the contacts 17 and 18 in a circuit with the battery 26 of the vehicle and which leads to individual signalling lamps (not shown) in a lamp housing 27 for the respective push-button switches 14. The circuit for the lamps preferably includes a flasher 28 of conventional construction.

The push-button switches 14 preferably comprise right and left hand direction signalling switches 29 and 30, a stop switch 31 and a slow or caution switch 32 mounted in a suitable arrangement on the cover plate 7 of the switch housing or panel 5.

In the operation of the device, a selected signalling lamp in lamp housing 27 is energized by pushing its related push button switch 14 inwardly which moves contact 17 into engagement with contact 18 and the resilient fingers 19 of the stationary contact 18 holds the switch in circuit-closing position.

In order to release or reset the switches, I provide a master push button 33 slidably mounted in a recess 34 preferably at the center of cover plate 7 and projecting into the switch housing 5 and suitably connected to support 20. An inward movement of master push button 33 forces the support 20 rearwardly in switch housing 5, to thus release the stationary contacts 18 from the contacts 17, to thus break the circuit for all of the signalling lamps.

The split clamp 10 and split collar 12 at the ends of supporting arm 11 enable the switch housing or panel 5 to be adjusted to a suitable position for the driver of the vehicle.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A vehicle signalling device comprising a switch housing including a back section and a cover plate secured thereto, an oblong movable panel in the housing behind the cover plate, coil springs in the housing adjacent the ends and sides of the panel holding the panel in a forward position in the housing, stationary contacts on the front surface of the panel in alignment with said springs, fasteners securing the stationary contacts to the front surface of said panel and also securing said springs to said panel, movable contacts on the inner surface of the cover plate, push buttons on the outer surface of the cover plate moving the movable contacts into engagement with the stationary contacts, and a master push button slidable in the cover plate and rigidly connected to the panel at the center thereof for moving the panel rearwardly to release the contacts and guiding said panel in its rearward movement.

HUGH B. O'BRIEN.

REFERENCES CITED

The following references are of record in the file of this patent:

UNITED STATES PATENTS

| Number | Name | Date |
| --- | --- | --- |
| 388,344 | Dey | Aug. 21, 1888 |
| 1,103,294 | Jones et al. | July 14, 1914 |
| 1,632,643 | Cobb et al. | June 14, 1927 |